United States Patent [19]

Valpreda

[11] 3,781,063
[45] Dec. 25, 1973

[54] MOTOR VEHICLE BRAKING CIRCUITS
[75] Inventor: Luigi Valpreda, Turin, Italy
[73] Assignee: FIAT Societa per Azioni, Turin, Italy
[22] Filed: Apr. 19, 1972
[21] Appl. No.: 245,454

[30] Foreign Application Priority Data
Apr. 28, 1971 Italy .............................. 68412 A/71

[52] U.S. Cl................................................. 303/6 C
[51] Int. Cl............................................. B60t 13/00
[58] Field of Search .................................... 303/6 C

[56] References Cited
UNITED STATES PATENTS

| | | | |
|---|---|---|---|
| 3,448,230 | 6/1969 | Bueler | 303/6 C |
| 3,162,491 | 12/1964 | Van Winsen | 303/6 C |
| 2,062,500 | 12/1936 | Casler et al. | 303/6 C |
| 3,450,443 | 6/1969 | Bueler | 303/6 C |
| 3,669,505 | 6/1972 | Falk | 303/6 C |

*Primary Examiner*—Lloyd L. King
*Attorney*—Richard C. Sughrue et al.

[57] ABSTRACT

A control device for motor vehicle hydraulic braking circuits of the type having separate circuits for the front wheel brakes and the rear wheel brakes and a pressure reducer for reducing the braking pressure applied to the rear wheel brakes in relation to the pressure applied to the front wheel brakes. The control device operates to short circuit or bypass the pressure reducer in the event of a loss of braking pressure in the front wheel braking circuit so that the maximum braking effect can be obtained from the rear wheels under these conditions. The device includes a piston and a valve controlling a bypass route which short circuits the pressure reducer, the piston is formed in two parts of different diameters and slides in a cylinder formed in two parts of correspondingly different diameters; hydraulic braking pressure is applied to one side of the piston from the front wheel braking circuit and to the other side of the piston from the rear wheel braking circuit so that the valve controlling the bypass route is closed under normal braking conditions, but opened if the pressure on the side of the piston supplied from the front wheel braking circuit should fall below its normal value. A spring biases the piston away from its operating position so that it is moved on enemy braking operation to ensure that it does not become inoperative due to a long period out of use.

6 Claims, 3 Drawing Figures

MOTOR VEHICLE BRAKING CIRCUITS

BACKGROUND OF THE INVENTION

The present invention relates to hydraulic braking systems for motor vehicles, and particularly to an improved control device for use in such hydraulic circuits.

Hydraulic braking circuits for motor vehicles, having separate hydraulic braking circuits for the front wheels and the rear wheels respectively, are known. In such circuits a pressure reducing device is sometimes connected into the rear wheel braking circuit, such a device is known as a braking corrector.

It is also known to fit systems of this type with a conduit arranged to short-circuit the pressure reducer, or braking corrector, and with a control device, referred to below as a "device of the type described", the main characteristic of which is that it operates to cut off the flow of hydraulic fluid in the conduit which short-circuits the pressure reducer, during normal braking conditions, that is when the front brake circuit is operating normally, and opens a path for the brake fluid through the said short circuit conduit in the event of a fall of pressure in the front braking circuit due, for example, to a breakdown of the front braking circuit.

In one known device of this type, this valve is held closed under normal conditions by the action of a spring and is so constructed as to undergo, during braking, a hydraulic thrust in one direction due to pressure in the front brake circuit which is greater than the hydraulic thrust in the other direction due to the pressure acting upon the rear brake circuit. As a result of this arrangement the valve is always in the closed position, even during braking, thus ensuring the operation of the pressure reducer in accordance with known methods. On the other hand, in the event of a failure causing the loss of hydraulic braking pressure in the front wheel braking circuit, the valve opens under the hydraulic pressure acting on it from the rear brake circuit which is no longer balanced by the front brake circuit, this short circuits the pressure reducer and allows braking of the vehicle without the driver having to exert excessive pressure upon the pedal which operates the brake pump in order to obtain effective braking.

This system has the disadvantage, however, that the valve which, when opened, short-circuits the pressure reducer to effectively prevent its intervention during braking of the rear wheels, is only operated on the very rare occasions when there is a loss of hydraulic pressure in the circuit controlling the braking of the front wheels. Thus, since it is likely that the valve will undergo long periods when it is not operated at all there is a substantial risk of the formation of deposits, thereby clogging or jamming the movable parts and perhaps causing distortion of the sealing joints so that the valve can in extreme cases become inoperative just when its satisfactory operation is most needed, that is upon the failure of the front wheel braking circuit.

OBJECT OF THE INVENTION

The object of the present invention is to provide a device of the type described above, which does not have this disadvantage and which ensures that in a double circuit braking system having a pressure reducer in the rear circuit, the rear brakes can be effectively operated in the case of a failure of the front circuit, without the operator having to exert excessive pressure upon the brake pedal.

SUMMARY OF THE INVENTION

According to the present invention, there is provided a control device for a motor vehicle hydraulic braking circuit of the type having separate circuits for the front wheels and rear wheels respectively, and a pressure reducer fitted in the circuit for the rear wheel brakes, characterised in that the control device includes a valve which is resiliently biased to an open position and which is closed by an increase of hydraulic pressure which occurs in the front wheel brake circuit during braking under normal conditions of the said circuit.

A preferred embodiment of the invention comprises a cylinder the bore of which has a first section of greater diameter and a second section of smaller diameter, the first section being closed by a plug and the second section being closed by an end wall having a central opening forming a port which, when the device is connected in an hydraulic braking circuit communicates with the hydraulic pressure, in the rear wheel braking circuit, a piston having a first part of greater diameter slidably mounted in the said first section of the bore of the cylinder, and a second portion of smaller diameter slidably mounted in the second section of the said bore; the end face of the second portion of the piston facing the end wall carrying a sealing disc which closes the said port in the end wall when the piston is moved to that end of the bore against the action of a resilient biasing spring, a first chamber being defined between the second part of the piston and the end of the second section of the bore in the cylinder and a second chamber being defined between the plug and the first part of the piston, the first chamber communicating with the said port and with a second port in the casing of the cylinder, and the said second chamber communicating with at least a third port, which is connectable to the front wheel braking pressure, the ratio between the diameters of the two parts of the piston being such that, when the control device is in use, the resultant hydraulic thrust which acts upon the piston when the brakes are applied is sufficient to overcome the resistance of the said biasing spring and to move the piston to close the said port so as to cut off communication between the first port and the second port.

Preferably the sealing disc is held in a frustoconical cavity in the end face of the second portion of the piston.

Preferably the plug has an axial opening forming the said third port, and an axially extending skirt projecting from the face of the plug towards the piston, the skirt having radial slots and a diameter which is less than that of the said first section of the bore of the cylinder for a purpose which will be described below.

In one embodiment of the invention the two parts of the piston are provided with sealing rings housed in annular peripheral grooves located in respective intermediate positions along the lengths of the two parts, and in that the said two parts of the piston are formed as separate elements which can be separately inserted into the cylinder.

The cylinder can moreover be constructed with a fifth port for the attachment of a further outer conduit and communicating with the said first port in a manner which is not affected by the operation of the sealing disc.

Various other features and advantages of the invention will become more apparant during the course of the following description with reference to the accompanying drawings: which is given purely by way of non-restrictive example.

DESCRIPTION OF THE PREFERRED EMBODIMENTS

Figure 1:
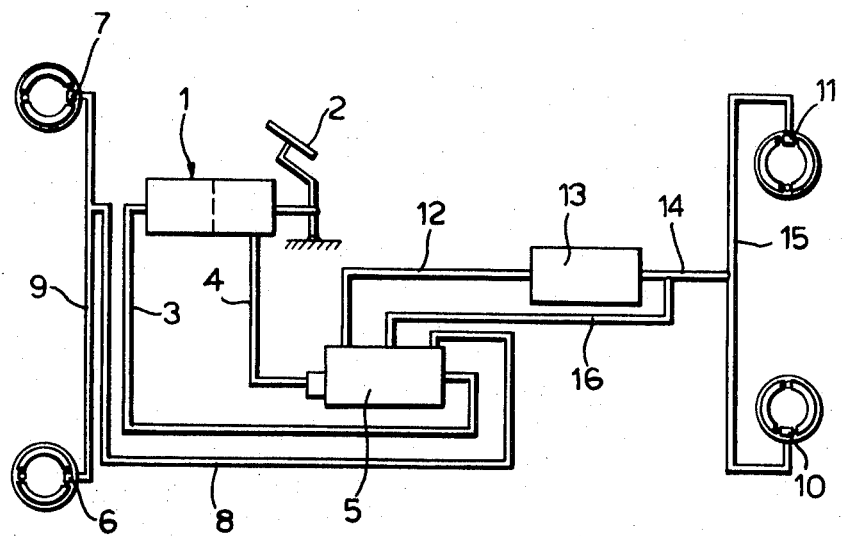
FIG. 1 is a diagrammatic view of an hydraulic braking system for a motor vehicle, comprising two separate circuits and a pressure reducer in the circuit for the rear wheels, the circuit being fitted with a device constructed as an embodiment of the invention.

In the drawings corresponding elements are indicated with the same reference numerals.

The hydraulic braking system illustrated in FIG. 1 comprises a master cylinder 1 controlled by a brake pedal 2 and is connected to supply braking fluid under pressure to two separate circuits, through conduits 3 and 4 respectively.

The conduits 3 and 4 are both connected to a control device 5, the construction and operation of which will be described in detail below. The device 5 is, in its turn, connected to front wheel brake cylinders, 6 and 7 respectively, by means of conduits 8 and 9; it is also connected to rear wheel brake cylinders 10 and 11 respectively by means of a system of conduits which includes a conduit 12 between the device 5 and a pressure reducer 13, a conduit 14 between the outlet of the pressure reducer 13, a conduit 15 communicating with the brake cylinders 10 and 11, and finally a conduit 16 between the device 5 and the conduit 14.

The pressure reducer 13, like the master cylinder 1, is of known type and is designed to ensure a reduction of the braking pressure operating in the rear wheel brake cylinders 10 and 11 in relation to that operating in the front wheel brake cylinders 6 and 7 according to a predetermined reduction ratio.

Figure 2:
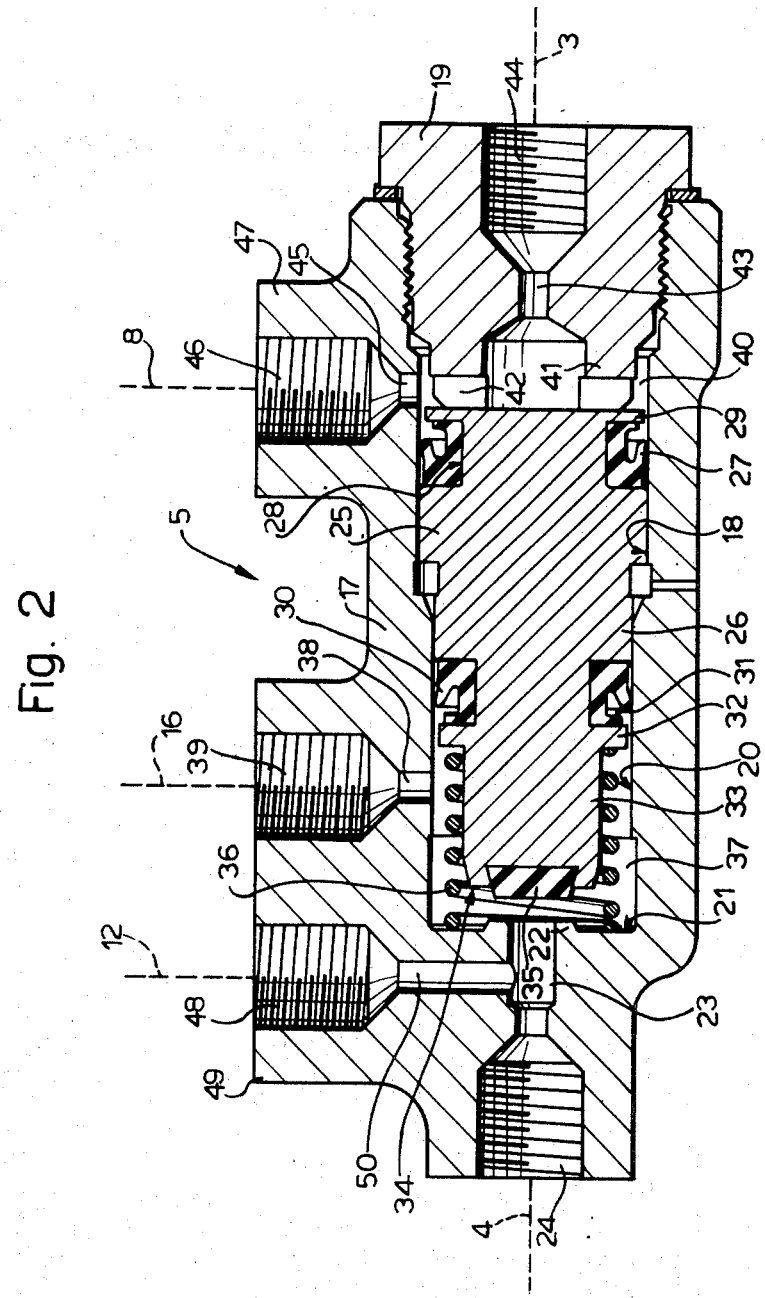
FIG. 2 is a longitudinal section, on a larger scale than FIG. 1, of a first embodiment of the invention.

The control device 5 illustrated in FIG. 2 comprises a cylinder 17 having a bore with a first section 18 of greater diameter closed by a plug 19 and a second section 20 of smaller diameter than the first section closed by an end wall 21. The end wall 21 has a central raised portion 22 with an axial opening forming a port 23 communicating with a threaded connection 24 to receive a connector for the conduit 4 leading to the master cylinder 1. Within the bore of the cylinder 17 there is located a piston 26 having a first part 25 of greater diameter which is free to slide in the first section 18 of the said bore, and a second portion 33 of smaller diameter than the first portion, which is free to slide in the second section 20 of the bore. Sealing between the first portion 25 of the piston and its associated part 18 of the bore of the cylinder is effected by an annular sealing ring with a lip 27 facing the plug 19. This sealing ring is housed in an annular peripheral groove 28 in the piston, situated near the end of the first portion 25 and having a shoulder 29 the outer diameter of which is slightly less than that of the remainder of the first portion 25 of the piston.

Similarly, sealing between the second portion 33 of the piston and the associated part 20 of the bore of the cylinder is effected by means of a similarly shaped sealing ring having a lip 30 facing the end wall 21 and housed in a peripheral annular groove 31 located near the end of the second portion 33 of the piston and defined on the side facing the end wall 21 by a radial shoulder 32 whose diameter is slightly less than that of the remainder of the second portion 33 of the piston 26.

The end face 34 of the portion 33 of the piston 26, which faces the end wall 21 has an under cut frustoconical cavity housing a resilient sealing disc 35 which is coaxial with the port 23. A portion of the resilient disc 35 projects from the face 34 of the portion 33 of the piston and has a diameter which is slightly greater than that of the port 23 and slightly less than that of the raised portion 22 of the end wall 21.

Between the shoulder 32 of the second portion 33 of the piston and the end wall 21 there is interposed a helical spring 36 which biases the piston 26 in the direction of the plug 19, and thereby keeps the sealing disc 35 normally spaced from the central raised portion 22 of the wall 21, and leaves the port 23 open.

A chamber 37 defined between the portion 33 of the piston 26 and the cylindrical wall of the bore of the cylinder 17, communicates through a lateral port 38 with a threaded connector seating 39 which can be connected by the conduit 16 to the conduit 14 interposed between the pressure reducer 13 and the conduit 15 connected to the rear brake cylinders 10 and 11 of the hydraulic circuit illustrated in FIG. 1.

Between the plug 19 and the shoulder 29 of the piston 26 there is defined a chamber 40 into which there extends an annular axial skirt 41 of the plug 19 the outer diameter of which is less than the diameter of the first section 18 of the bore of the cylinder 17 and which has a plurality of radial slots 42. The skirt 41 acts as a stop member to limit the movement of the piston towards the plug 19. The chamber 40 communicates via an axial port 43 of the plug 19 with a threaded connector seating 44 in the outer face of the plug 19 which is to be connected to the master cylinder 1 by means of the conduit 3. The chamber 40 also communicates by means of a radial port 45 with a threaded connector seating 46 formed in a lateral boss 47 of the cylinder 17, which is to be connected to the front brake cylinders 6 and 7 respectively by means of the conduit 8.

The cylinder 17 is also provided with a further threaded connector seating 48 in the lateral boss 49 in which the threaded connector seating 39 is formed; this latter seating 48 communicates through an inner radial port 50 with the axial port 23 between the chamber 37 and the connector seating 24. The connector 48 is arranged to be connected to the conduit 12 communicating with the inlet of the pressure reducer 13.

Figure 3:
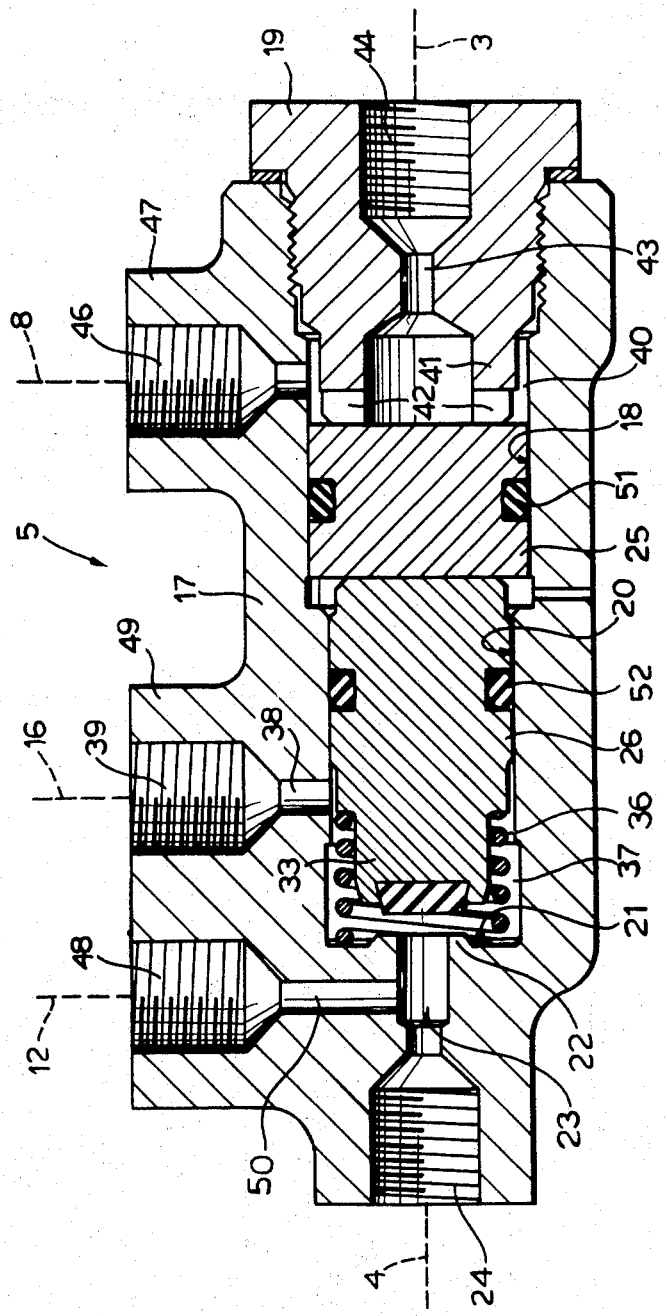
FIG. 3 is a longitudinal section, also on an enlarged scale, showing a second embodiment of the invention.

The embodiment illustrated in FIG. 3 differs from that of FIG. 2 in that the sealing between the portions 25 and 23 of the piston 26 and their respective parts 18 and 20 of the bore of the cylinder 17 if formed by annular sealing rings 51 and 52 respectively which have an O shaped cross section and which are housed in peripheral annular grooves in the curved surfaces of the portions 25, 33 of the piston, roughly mid-way along the sides of the said respective portions. In order to facilitate, in this case, assembly of the piston in the bore of the cylinder, the portions 25 and 33 of the piston 26 are formed as two separate pieces and held together by the action of the spring 36.

The piston 26 and the spring 36 are, of course, so proportioned that the resultant of the opposed hydraulic thrusts acting upon the piston during braking under normal conditions with both of the circuits operating properly, is capable of moving the piston towards the end wall 21, against the action of the spring 36 so as to close the communication between the port 23 and the chamber 37 by means of the sealing disc 35, thus interrupting the communication between the conduits 4 and 16 and thereby ensuring normal operation of the pressure reducer 13.

OPERATION

Operation of the circuit and the devices illustrated in FIGS. 2 and 3 is as follows:

Before the hydraulic braking system illustrated in FIG. 1 is operated the elements of the cylinder 17 are in the positions illustrated in FIGS. 2 and 3 respectively.

When braking commences, hydraulic pressure is transmitted from the master cylinder 1 to chambers 40 and 37 respectively of the cylinder 17 through the conduits 3 and 4 respectively, so that a hydraulic thrust is applied to each side of the piston 26, the resultant thrust on the piston 26 moving it away from the plug 19 and pushing it in the direction of the end wall 21, against the resistance of the spring 36.

After a brief flow of liquid between the ports 23 and 38, which takes place during the time when the piston is approaching the end wall 21 and the friction elements of the front and rear brakes are being applied, communication between the port 23 and the chamber 37 is cut off by the sealing disc 35. From this point the brake fluid can only reach the cylinders 10 and 11 of the rear brakes through the port 50 of the threaded seating 48 connected to the conduit 12 which communicates with the inlet of pressure reducer 13.

On release of the brake pedal the thrust of the spring 36 returns the piston 25, 26 back to its initial position in which it rests against the skirt 41 of the plug 19, re-establishing communication between the port 23 and the chamber 37.

Braking operation of the cylinders 6 and 7 of the front brakes is not effected because the brake fluid can at all times pass from the conduit 3 to the conduit 8 through the threaded connector seating 44 of the plug 19, the axial port 43, the radial slots 42 of the skirt 41, the port 45 and the threaded connector seating 46.

If, during braking operation of the braking system there should occur a fault in that portion of the hydraulic circuit which controls the braking of the front wheels and resulting in a loss of braking pressure in this part of the circuit then the movement of the piston 25, 26 in the direction of the end wall 21 will not take place or the piston will return from this position under the action of the spring 36 so that the pressure will be transmitted from the conduit 4 to the branches 14 and 15 connected to the cylinders 10 and 11 of the rear brakes through the conduit 16 which by-passes the pressure reducer 13 so that full braking pressure is applied to the rear wheel brakes.

What is claimed is:

1. A control device for a motor vehicle braking system of the type having separate circuits for the front and rear wheels respectively and a pressure reducer in the rear wheel braking circuit for reducing the rear wheel braking pressure in relation to the front wheel braking pressure, said control device comprising:

a cylinder, said cylinder having a bore therethrough, said bore having a first section and a second section, said first section of said bore having a greater diameter than said second section of said bore, a plug closing said first section of said bore in said cylinder, an end wall closing said second section of said bore in said cylinder, an opening in said end wall, said opening forming a first port in said control device, means for connecting said first port to said braking pressure in said rear wheel braking circuit, a piston having a first part and a second part, said first part being of greater diameter than said second part and said first and second parts of said piston being slidably mounted in said first and second sections respectively of said bore in said cylinder, an end wall of said second part of said piston facing said end wall closing said second section of said bore in said cylinder, a sealing disc in said end wall of said second part of said piston, said sealing disc cooperating with said opening in said end wall of said second section of said cylinder to close said port in said end wall thereof when said piston moves towards said end wall, a resilient biasing spring mounted between said end wall of said second section of said bore in said cylinder and said piston, said spring biasing said piston away from closing engagement of said sealing disc with said first port, means defining a first damper between said second part of said piston and said end wall of said second section of said bore said first port communicating with said first chamber, means defining a second chamber between said first part of said piston and said plug in said first section of said bore, means defining a second port in said cylinder, said second port communicating with said first chamber, means defining a third port, said third port communicating with said second chamber, means for connecting said third port to said front wheel braking circuit, the ratio of the diameters of said first and second parts of said piston being such that the resultant hydraulic force on said piston when said brakes are applied overcomes the resistance of said biasing spring and moves said piston toward said end wall of said second section of said bore in said cylinder whereby said first port is closed by said sealing disc thereby cutting off communication between said first port and said second port.

2. The control device of claim 1 wherein said second part of said piston is formed with an axial extension which carries said sealing disc on the end face thereof.

3. The control device of claim 1 wherein said end face of said second part of said piston has a frustoconical cavity therein, said sealing disc being held in said frusto-conical cavity.

4. The control device of claim 1 wherein there is provided an abutment stop against which said piston is biased by said biasing spring, said abutment stop being formed by an axial skirt projecting from said plug, said skirt having a number of radial slots therein, a fourth port in said cylinder, said radial slots allowing communication between said fourth port and said second chamber of said device.

5. The control device of claim 1 wherein said first and second parts of said piston are provided with respective sealing rings in annular peripheral grooves intermediate along the length of said parts of said piston, said two parts of said piston being formed as two pieces and assembled separately in said cylinder.

6. The control device of claim 1 wherein said cylinder is formed with a fifth port, said fifth port communicating with said first port, said communication being independent of said valve formed by said sealing disc.

* * * * *